(12) United States Patent
Ackerman et al.

(10) Patent No.: US 8,806,849 B2
(45) Date of Patent: Aug. 19, 2014

(54) SYSTEM AND METHOD OF OPERATING A POWER GENERATION SYSTEM WITH AN ALTERNATIVE WORKING FLUID

(75) Inventors: John Frederick Ackerman, Laramie, WY (US); Matthew Timothy Franer, Norwood, OH (US); Randy Lee Lewis, Lebanon, OH (US); David Allen Bell, Laramie, WY (US); Morris Dee Argyle, Laramie, WY (US); Brian Francis Towler, Laramie, WY (US)

(73) Assignees: The University of Wyoming, Laramie, WY (US); General Electric Company, Schenectady, NY (US)

( * ) Notice: Subject to any disclaimer, the term of this patent is extended or adjusted under 35 U.S.C. 154(b) by 945 days.

(21) Appl. No.: 12/182,837

(22) Filed: Jul. 30, 2008

(65) Prior Publication Data
US 2010/0024381 A1    Feb. 4, 2010

(51) Int. Cl.
*F02C 3/34*    (2006.01)
*F02C 6/00*    (2006.01)
*F02C 6/18*    (2006.01)

(52) U.S. Cl.
USPC ............. 60/39.5; 60/39.52; 60/39.15

(58) Field of Classification Search
CPC .............. F02C 3/34; F02C 3/107; F02C 3/13; F02C 6/003; F02C 6/02
USPC ........... 60/39.181–39.183, 39.52, 39.5, 39.15
See application file for complete search history.

(56) References Cited

U.S. PATENT DOCUMENTS

| | | | |
|---|---|---|---|
| 2,443,841 A | 6/1948 | Sweeney et al. | |
| 2,478,682 A | 8/1949 | Blackwood | |
| 4,148,185 A * | 4/1979 | Somers | 60/39.17 |
| 4,204,401 A | 5/1980 | Earnest | |
| 4,413,475 A | 11/1983 | Moscrip | |
| 4,434,613 A | 3/1984 | Stahl | |
| 4,866,928 A | 9/1989 | Raiko | |
| 5,175,995 A | 1/1993 | Pak et al. | |

(Continued)

FOREIGN PATENT DOCUMENTS

DE    4303174 A1    8/1994
JP    H06117274 A   4/1994

(Continued)

OTHER PUBLICATIONS

International Search Report issued in connection with corresponding PCT Application No. PCT/US2009/049856 on Feb. 23, 2010.

(Continued)

*Primary Examiner* — Andrew Nguyen
(74) *Attorney, Agent, or Firm* — William Scott Andes, Esq.; Armstrong Teasdale LLP

(57) ABSTRACT

A method of operating a turbine engine system and a turbine engine system are provided. The method comprises supplying a flow of oxygen to a combustion chamber defined within a plurality of turbines coupled serially together within the turbine engine system, supplying a flow of hydrocarbonaccous fuel to the combustion chambers of each of the plurality of turbines in the turbine engine system, and supplying a working fluid to an inlet of a first turbine engine coupled within the turbine engine system, wherein the working fluid is substantially nitrogen-free and wherein each of the turbines coupled within the turbine engine system is operable with the resulting fuel-oxygen-working fluid mixture.

13 Claims, 3 Drawing Sheets

(56) References Cited

U.S. PATENT DOCUMENTS

| | | |
|---|---|---|
| 5,331,806 A | 7/1994 | Warkentin |
| 5,724,805 A | 3/1998 | Golomb et al. |
| 5,970,702 A | 10/1999 | Beichel et al. |
| 6,079,197 A * | 6/2000 | Attia ............................. 60/774 |
| 6,089,024 A | 7/2000 | Hatanaka |
| 6,148,602 A | 11/2000 | Demetri |
| 6,170,264 B1 | 1/2001 | Viteri et al. |
| 6,178,738 B1 | 1/2001 | Frutschi |
| 6,260,348 B1 | 7/2001 | Sugishita et al. |
| 6,484,508 B2 | 11/2002 | Rocklin et al. |
| 6,910,335 B2 * | 6/2005 | Viteri et al. ..................... 60/786 |
| 7,007,484 B2 | 3/2006 | Stegmaier et al. |
| 7,096,674 B2 | 8/2006 | Orlando et al. |
| 7,254,950 B2 | 8/2007 | Joshi et al. |
| 7,284,377 B2 | 10/2007 | Joshi et al. |
| 2002/0023423 A1 | 2/2002 | Viteri et al. |
| 2003/0233830 A1 | 12/2003 | Marin et al. |
| 2004/0177617 A1 | 9/2004 | Frutschi et al. |
| 2005/0011179 A1 | 1/2005 | Ooka et al. |
| 2007/0199300 A1 | 8/2007 | MacAdam et al. |
| 2008/0060346 A1 | 3/2008 | Asen et al. |

FOREIGN PATENT DOCUMENTS

| | | |
|---|---|---|
| JP | 2002500313 A | 1/2002 |
| JP | 2007309315 A | 11/2007 |
| JP | 2008517216 A | 5/2008 |
| WO | 2004044388 A1 | 5/2004 |

OTHER PUBLICATIONS

Office Action from JP Application No. 20-521161 dated Jul. 23, 2013 along with unofficial English translation.

* cited by examiner

SYSTEM AND METHOD OF OPERATING A POWER GENERATION SYSTEM WITH AN ALTERNATIVE WORKING FLUID

BACKGROUND OF THE INVENTION

The present disclosure relates generally to gas turbine engines and, more particularly, to power generation systems that operate with an alternative working fluid.

Gas turbine engines produce mechanical energy using a working fluid supplied to the engines. More specifically, in known gas turbine engines, the working fluid is air that is compressed and delivered, along with fuel and oxygen, to a combustor, wherein the fuel-air mixture is ignited. As the fuel-air mixture burns, its energy is released into the working fluid as heat. The temperature rise causes a corresponding increase in the pressure of the working fluid, and following combustion, the working fluid expands as it is discharged from the combustor downstream towards at least one turbine. As the working fluid flows past each turbine, the turbine is rotated and converts the heat energy to mechanical energy in the form of thrust or shaft power.

Air pollution concerns worldwide have led to stricter emissions standards both domestically and internationally. Pollutant emissions from at least some gas turbines are subject to Environmental Protection Agency (EPA) standards that regulate the emission of oxides of nitrogen (NOx), unburned hydrocarbons (HC), and carbon monoxide (CO). In general, engine emissions fall into two classes: those formed because of high flame temperatures (NOx), and those formed because of low flame temperatures that do not allow the fuel-air reaction to proceed to completion (HC & CO).

Air has been used as a working fluid because it is readily available, free, and has predictable compressibility, heat capacity, and reactivity (oxygen content) properties. However, because of the high percentage of nitrogen in air, during the combustion process, nitrogen oxide (NOx) may be formed. In addition, carbon contained in the fuel may combine with oxygen contained in the air to form carbon monoxide (CO) and/or carbon dioxide ($CO_2$).

To facilitate reducing NOx emissions, at least some known gas turbine engines operate with reduced combustion temperatures and/or Selective Catalytic Reduction (SCR) equipment. However, operating at reduced combustion temperatures reduces the overall efficiency of the gas turbine engine. Moreover, any benefits gained through using known SCR equipment may be outweighed by the cost of the equipment and/or the cost of disposing the NOx. Similarly, to facilitate reducing CO and/or $CO_2$ emissions, at least some known gas turbine engines channel turbine exhaust through a gas separation unit to separate $CO_2$ from $N_2$, the major component when using air as the working fluid, and at least one sequestration compressor. Again however, the benefits gained through the use of such equipment may be outweighed by the costs of the equipment.

BRIEF DESCRIPTION OF THE INVENTION

In one aspect a method of operating a turbine engine system is provided. The method comprises supplying a flow of oxygen to a combustion chamber defined within a plurality of turbines coupled serially together within the turbine engine system, supplying a flow of hydrocarbonaceous fuel to the combustion chambers of each of the plurality of turbines in the turbine engine system, and supplying a working fluid to an inlet of a first turbine engine coupled within the turbine engine system, wherein the working fluid is substantially nitrogen-free and wherein each of the turbines coupled within the turbine engine system is operable with the resulting fuel-oxygen-working fluid mixture.

In another aspect, a gas turbine engine system is provided. The gas turbine engine system includes a plurality of gas turbine engines and an exhaust gas conditioning system. Each gas turbine engine includes at least one combustion chamber and at least one turbine downstream from the combustion chamber. Each combustion chamber is coupled in flow communication to a source of hydrocarbonaceous fuel and to a source of oxygen. Each of the gas turbine engines is operable with a working fluid that is substantially nitrogen-free. The exhaust gas conditioning system is coupled between a discharge outlet of a last of the gas turbine engines coupled together in the system and an inlet of a first of the gas turbine engines coupled together in the system.

In a further aspect, a power generation system is provided. The power generation system includes a first turbine engine including an inlet and a discharge outlet, and a second turbine engine including an inlet and a discharge outlet. The second turbine engine inlet is coupled to the first turbine engine discharge outlet for receiving exhaust gases discharged therefrom for use as a working fluid in the second turbine engine. Each of the first and second turbines includes at least one combustion chamber and at least one turbine downstream from the at least one combustion chamber. Each of the combustion chambers is coupled in flow communication to a source of hydrocarbonaceous fuel and to a source of oxygen.

DETAILED DESCRIPTION OF THE INVENTION

Figure 1:
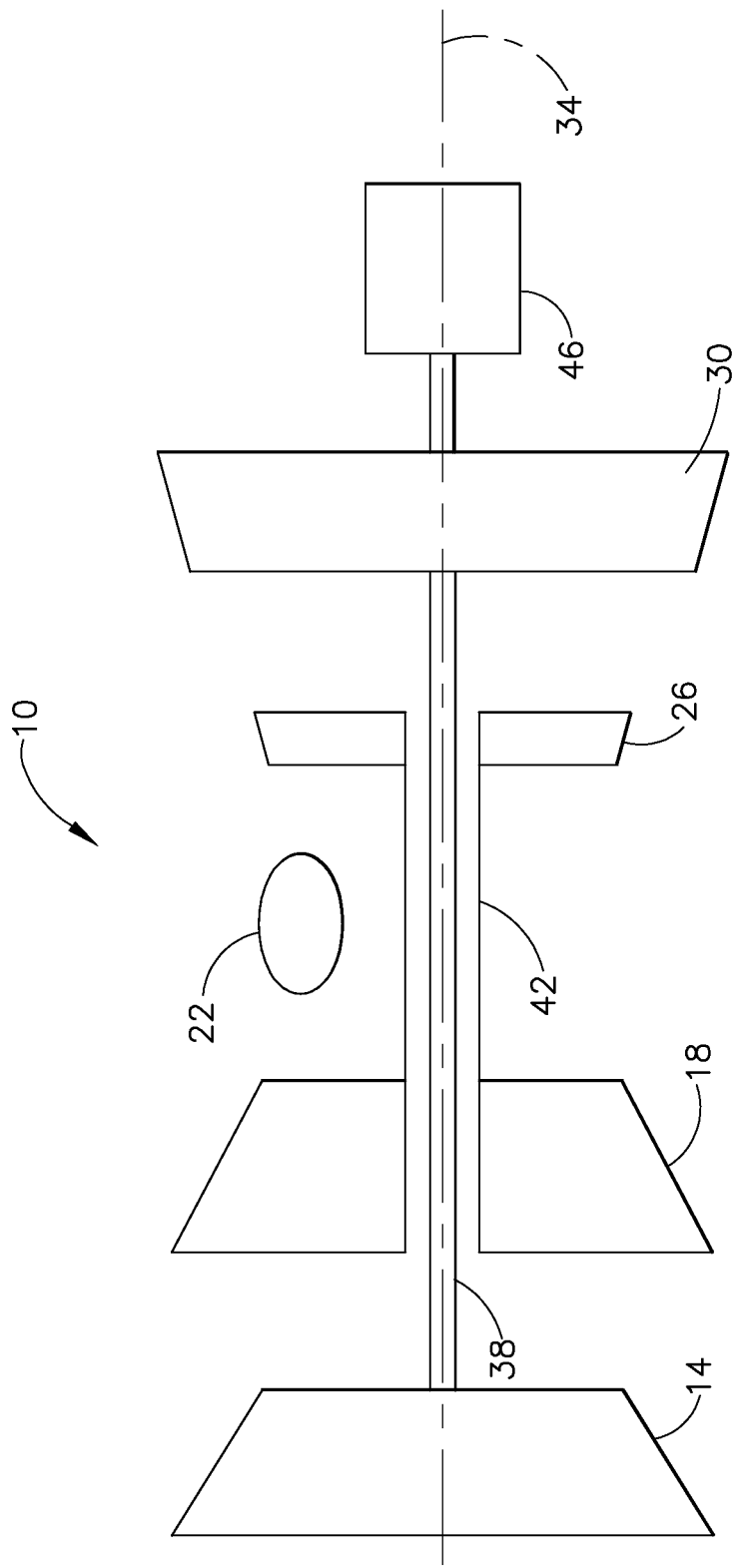
FIG. 1 is a schematic illustration of an exemplary gas turbine engine.

FIG. 1 is a schematic illustration of an exemplary gas turbine engine 10. In the exemplary embodiment, engine 10 includes a low pressure compressor 14, a high pressure compressor 18 downstream from low pressure compressor 14, a combustor assembly 22 downstream from high pressure compressor 18, a high pressure turbine 26 downstream from combustor assembly 22, and a low pressure turbine 30 downstream from high pressure turbine 26. Moreover, in the exemplary embodiment, compressors 14 and 18, combustor assembly 22, and turbines 26 and 30 are coupled together in a serial flow communication.

In the exemplary embodiment, the rotatable components of gas turbine engine 10 rotate about a longitudinal axis indicated as 34. A typical configuration for engines of this type is a dual concentric shafting arrangement, wherein low pressure turbine 30 is drivingly coupled to low pressure compressor 14 by a first shaft 38, and high pressure turbine 26 is drivingly coupled to high pressure compressor 18 by a second shaft 42 that is internal to, and concentrically aligned with respect to, shaft 38. In the exemplary embodiment, low pressure turbine 30 is coupled directly to low pressure compressor 14 and to a load 46. For example, in one embodiment, engine 10 is manufactured by General Electric Company of Evendale, Ohio under the designation LM6000. Although the present invention is described as being utilized with gas turbine engine 10, it will be understood that it can also be utilized with marine and industrial gas turbine engines of other configurations, such as one including a separate power turbine downstream from low pressure turbine 30 that is connected to a load (e.g., an LM1600 manufactured by General Electric Company), or to a single compressor-turbine arrangement (e.g., the LM2500 manufactured by General Electric Company), as well as with aeronautical gas turbine engines and/or heavy duty gas turbine engines that have been modified appropriately.

During operation, air enters through an inlet and is channeled towards high pressure compressor 14 and then to low pressure compressor 18. Compressed air is delivered to combustor 22 wherein the air is at least mixed with fuel and ignited. Airflow discharged from combustor 18 drives high pressure turbine 26 and low pressure turbine 30 prior to exiting gas turbine engine 10.

Figure 2:
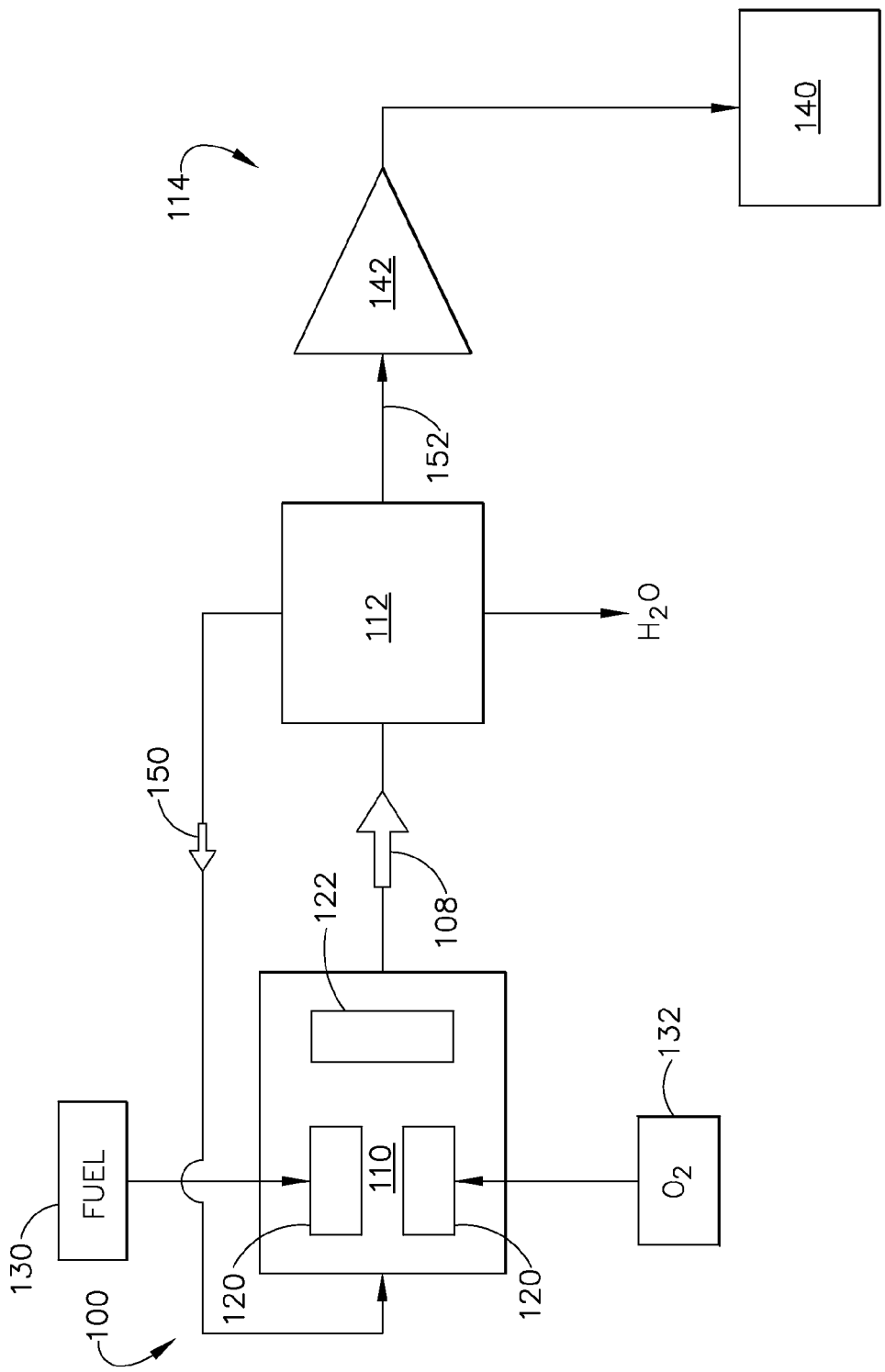
FIG. 2 is a schematic illustration of an exemplary turbine engine system that may include the gas turbine engine shown in FIG. 1.

FIG. 2 is a schematic illustration of an exemplary turbine engine system 100 that may be used with gas turbine engine 10 (shown in FIG. 1). Alternatively, system 100 may be used with a land-based and/or aero-derived turbine, a single- or duel-fueled turbine, and/or any turbine that has been modified to enable system 100 to function as described herein. Moreover, system 100 may be used as a simple cycle machine, or may be used within a combined cycle system, including an integrated gasification combined cycle (IGCC) system.

In the exemplary embodiment, system 100 includes a turbine engine 110, a heat exchanger or an air separator unit (ASU) 112, and a sequestration sub-system 114. More specifically, in the exemplary embodiment, turbine engine 110 includes a combustion chamber 120 that is coupled upstream from at least one turbine 122. In other embodiments, engine 110 may include other components, such as, but not limited to, a fan assembly (not shown), and/or at least one compressor, such as compressor 14 (shown in FIG. 1). Moreover, in other embodiments, system 100 may include any exhaust gas conditioner, other than a heat exchanger or ASU, that enables system 100 to function as described herein.

Engine 110 is coupled in flow communication with to a source of hydrocarbonaceous fuel 130 and to a source of oxygen 132. In the exemplary embodiment, fuel supplied from fuel source 130 may be, but is not limited to being, natural gas, syngas and/or distillates. In one embodiment, oxygen is supplied to engine 110 from a pressure-cycle, and/or other $O_2$ separator. In another embodiment, oxygen source 132 is a pressurized oxygen tank. Moreover, in another embodiment, the source of oxygen 132 is coupled to a pressurizing source (not shown), such as a compressor, to ensure that the supply of oxygen is supplied to engine 110 at a pre-determined operating pressure.

Heat exchanger or an air separator unit (ASU) 112 is coupled downstream from, and in flow communication with, turbine 110, such that exhaust gases 108 discharged from turbine 110 are channeled through exchanger 112. In the exemplary embodiment, heat exchanger 112 facilitates removing heat and water vapor from exhaust gases 108 channeled therethrough. More specifically, in the exemplary embodiment, exchanger 112 is coupled in flow communication with a source of cooling fluid, such as, but not limited to air or water.

Heat exchanger 112 is also coupled upstream from, and in flow communication with, turbine 110, such that heat exchanger 112 supplies working fluid to turbine 110 during engine operations. More specifically, as described in more detail below, in the exemplary embodiment, heat exchanger 112 discharges a stream of $CO_2$ and steam i.e., a working fluid stream 150, from turbine exhaust 108 to turbine engine 110 for use in combustion chamber 120.

Sequestration sub-system 114 is coupled in flow communication with, and downstream from, heat exchanger 112. As such, during turbine operation, as described in more detail below, a portion of $CO_2$ and steam, i.e., a sequestration stream 152, from turbine exhaust 108 within heat exchanger 112 is channeled through sequestration sub-system 114. In the exemplary embodiment, heat exchanger 112 effectively removes the steam as condensed water from the turbine exhaust 108 and from sequestration stream 152. Moreover, in the exemplary embodiment, sub-system 114 includes a storage chamber 140 and a compressor 142 that pressurizes the fluid flow transferred from heat exchanger 112 to storage chamber 140. In an alternative embodiment, compressor 142 is coupled in flow communication to a second turbine system (not shown) that uses sequestration stream 152 as a working fluid. Moreover, in another alternative embodiment, sub-system 114 does not include compressor 142, but rather includes any other known component that pressurizes fluid flow channeled to chamber 140, as described herein. In one embodiment, storage chamber 140 is a sub-surface sequestration chamber. In another embodiment, chamber 140 is a sub-surface geologic feature and/or a depleted natural gas dome.

During operation, turbine engine 110 is operated using working fluid 150 that is substantially nitrogen-free. For example, in the exemplary embodiment, the working fluid 150 is between approximately 99 to 100% free from nitrogen. More specifically, and as described in more detail below, in the exemplary embodiment, working fluid stream 150 is substantially carbon dioxide $CO_2$. For example, in the exemplary embodiment, the working fluid 150 is between approximately 98 and 100% $CO_2$.

To facilitate start up operations of turbine engine 110, in one embodiment, turbine engine 110 is also coupled to a source of pressurized $CO_2$. During operations, in the exemplary embodiment, $CO_2$ is supplied to an inlet (not shown) of combustion chamber 120. In other embodiments, $CO_2$ may be supplied to an inlet (not shown) of turbine engine 110, and may enter turbine engine 110 upstream from combustion chamber 120, such as, but not limited to, upstream from a fan assembly (not shown). Moreover, engine 110 is also supplied with a flow of hydrocarbonaceous fuel from fuel source 130 and oxygen from oxygen source 132. In the exemplary embodiment, fuel source 130 and oxygen source 132 are each coupled to combustion chamber 120 and supply respective streams of fuel and oxygen directly to combustion chamber 120. The fuel and oxygen are mixed with $CO_2$ stream 150 and the resulting mixture is ignited within combustion chamber 120. The resulting combustion gases produced are channeled downstream towards, and induce rotation of, turbine 122. Rotation of turbine 122 supplies power to load 46. Exhaust gases 108 discharged from turbine engine 110 are channeled towards heat exchanger 112.

Cooling fluid flowing through heat exchanger 112 facilitates reducing an operating temperature of gases 108, such that water vapor contained in exhaust gases 108 is condensed and such that carbon dioxide $CO_2$ contained in exhaust gases 108 is substantially separated from the water vapor. Depending on loading requirements of turbine engine 110, the carbon dioxide $CO_2$ separated from exhaust gases 108 is either returned to engine 110 via working fluid stream 150, or is channeled for sequestration within storage chamber 140 via sequestration stream 152.

Because turbine engine 110 uses working fluid stream 150, and because stream 150 is substantially nitrogen-free, during engine operations, substantially little or no NOx is produced.

As such, combustion chamber 120 can be operated at a higher temperature than known combustion chambers operating with air as a working fluid, while maintaining NOx emissions within pre-determined limits. The higher operating temperatures facilitate combustion chamber 120 operating closer to, or at, its thermodynamic optimum. Moreover, the use of a nitrogen-free working fluid 150, facilitates less costly production of power from turbine engine system 100 as compared to known turbine engine systems which use more expensive/less reliable nitrogen/carbon dioxide sequestration equipment.

In addition, because stream 150 is substantially nitrogen-free and only contains substantially carbon dioxide, during engine operations, turbine engine 110 is operable with a higher heat capacity. In some embodiments, the higher heat capacity facilitates the operation of turbine engine system 100 with higher compressor exit pressures at equivalent temperatures (i.e., more compressor stages at equal temperature) as compared to conventional turbine engine systems. As such, the overall operating efficiency of turbine engine system 100 is higher as compared to other known turbine engine systems. Moreover, with the use of working fluid 150, combustion rates within turbine engine system 100 are more easily controlled via control of the amount of oxygen supplied to turbine 110 as compared to the amount of carbon dioxide supplied to turbine 110, i.e., an $O_2/CO_2$ ratio, as compared to known turbine engine systems. As such, a more uniform heat release and/or advanced re-heat combustion is facilitated to be achieved.

Figure 3:
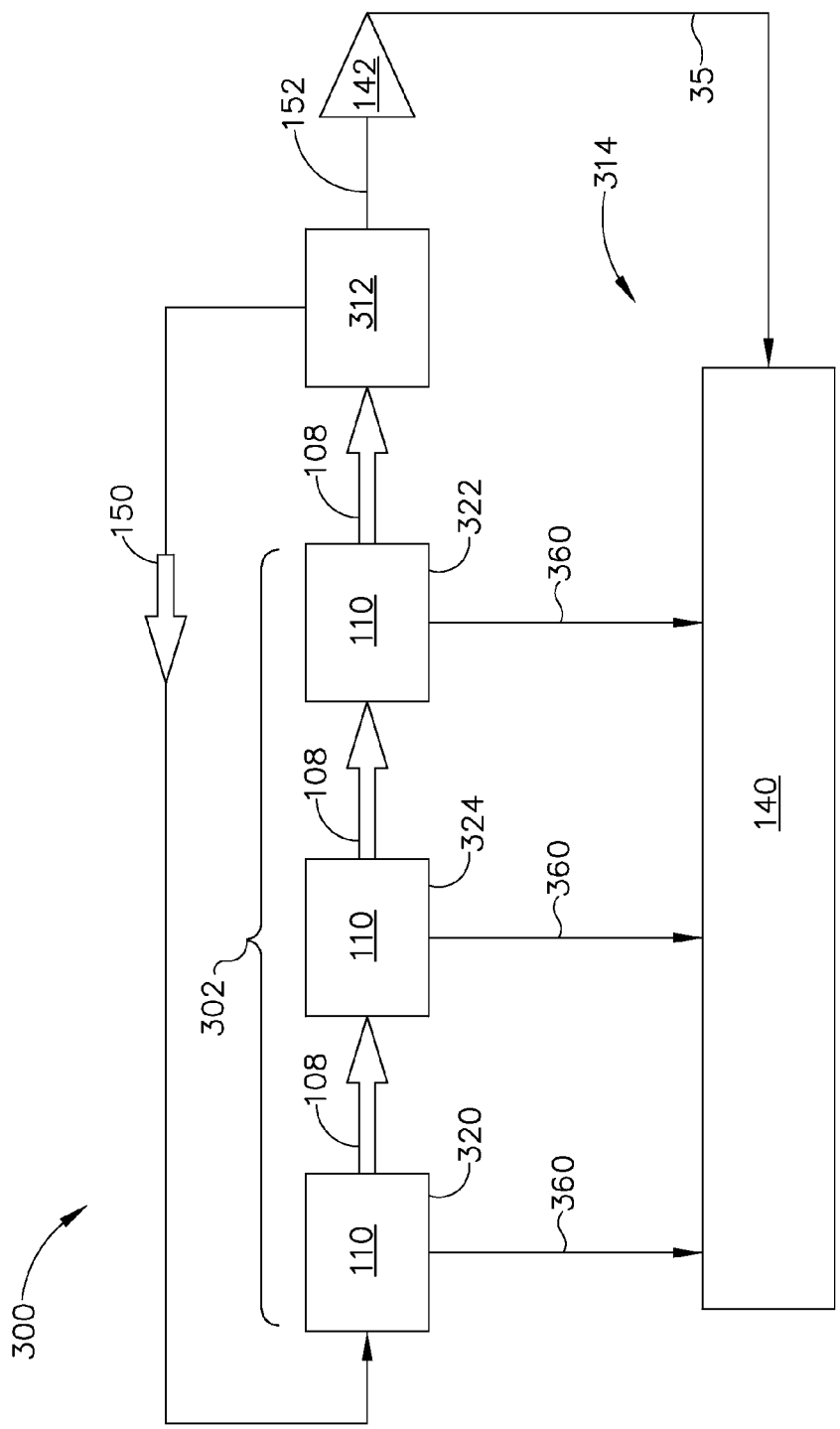
FIG. 3 is a schematic illustration of an exemplary power generation system that may be used with the turbine engine system shown in FIG. 2.

FIG. 3 is a schematic illustration of an exemplary power generation system 300 that may be used with turbine engine system 100 to generate power. In the exemplary embodiment, power generation system 300 includes a plurality of turbine engines 110 that are each operable in engine system 100, as described in more detail below. More specifically, as shown in FIG. 3, turbines 300 are each coupled in a series flow arrangement 302. Generally, and as is described in more detail below, the exhaust 108 discharged from each turbine 110 coupled in the series flow arrangement is discharged into a subsequent turbine 110 that is immediately downstream from that turbine 110, and the exhaust discharged from the last turbine 110 coupled in the series flow arrangement 302 is discharged to a common sequestration sub-system 314.

In the exemplary embodiment, system 300 includes turbine engines 110, a heat exchanger or an air separator unit (ASU) 312, and a sequestration sub-system 314. More specifically, in the exemplary embodiment, each turbine engine 110 includes a combustion chamber (not shown in FIG. 3) that is coupled upstream from at least one turbine (not shown in FIG. 3). In other embodiments, each engine 110 may include other components, such as, but not limited to, a fan assembly (not shown), and/or at least one compressor, such as compressor 14 (shown in FIG. 1). Moreover, in other embodiments, system 300 may include any exhaust gas conditioner, other than a heat exchanger or ASU, that enables system 300 to function as described herein.

In the exemplary embodiment, engines 110 are each substantially identical. For example, each turbine engine 110 may be an LM6000 Engine manufactured by General Electric Company of Evendale, Ohio. Although three engines 110 have been illustrated in FIG. 3, system 300 may include more or less than three engines 110. In each embodiment, system 300 will include at least a first engine 320 and a last engine 322, based on their coupling order in the series flow arrangement 302. In addition, and as illustrated in FIG. 3, system 300 may also include at least one turbine 324 that is coupled in series flow communication between first engine 320 and last engine 322. Alternatively, each engine 110 in coupled within system 300 may be different depending on loading requirements, for example.

A heat exchanger or an air separator unit (ASU) 312 is coupled downstream from, and in flow communication with, turbines 110, such that exhaust gases 108 discharged from turbines 110 are channeled through exchanger 312. More specifically, in the exemplary embodiment, heat exchanger 312 is substantially similar to heat exchanger 110 (shown in FIG. 2) and is coupled in serial flow communication with turbine 322 such that all of the exhaust 108 discharged from turbine 322 is channeled through heat exchanger 312.

In the exemplary embodiment, heat exchanger 312 functions similarly to heat exchanger 112 and facilitates removing heat and water vapor from exhaust gases 108 channeled therethrough. Heat exchanger 312 is also coupled upstream from, and in flow communication with, first turbine 320, such that heat exchanger 312 supplies working fluid to turbine 320 during engine operations. More specifically, as described in more detail below, in the exemplary embodiment, heat exchanger 312 discharges a stream of $CO_2$, i.e., a working fluid stream 150, from turbine exhaust 108 to turbine engine 320.

Sequestration sub-system 114 is coupled in flow communication with, and downstream from, heat exchanger 312. As such, during turbine operation, as described in more detail below, a portion of $CO_2$, i.e., a sequestration stream 152 from within heat exchanger 312 is channeled through sequestration sub-system 114. In the exemplary embodiment, sub-system 114 includes storage chamber 140 and a compressor 142 that pressurizes the fluid flow transferred from heat exchanger 312 to storage chamber 140. Moreover, in an alternative embodiment, sub-system 114 does not include compressor 142, but rather includes any other known component that pressurizes fluid flow channeled to chamber 140, as described herein. In one embodiment, storage chamber 140 is a sub-surface sequestration chamber.

During operation, each turbine engine 110 is operated using working fluid 150 that is substantially nitrogen-free. For example, in the exemplary embodiment, the working fluid 150 is between approximately 99% and 100% free from nitrogen. More specifically, and as described in more detail below, in the exemplary embodiment, working fluid stream 150 is substantially carbon dioxide $CO_2$. For example, in the exemplary embodiment, the working fluid 150 is between approximately 98% and 100% $CO_2$.

To facilitate start up operations of system 300, in one embodiment, arrangement 302 is also coupled to a source of pressurized $CO_2$. During operations, each engine 110 is also supplied directly with a flow of hydrocarbonaceous fuel from a fuel source and oxygen from an oxygen source. In the exemplary embodiment, the fuel source and the oxygen source each supply respective streams of fuel and oxygen directly to a combustion chamber (not shown in FIG. 3) defined in each respective turbine engine 110. The fuel and oxygen are mixed with $CO_2$ stream 150 and the resulting mixture is ignited within each respective turbine engine 110. The resulting combustion gases 108 produced are channeled downstream towards an immediately downstream turbine engine, i.e., from turbine engine 320 into an inlet of turbine engine 324, and from turbine engine 324 into an inlet of turbine engine 322. Exhaust gases 108 discharged from turbine engine 312 are channeled through heat exchanger 312.

In addition, because stream 150 is substantially nitrogen-free and only contains substantially carbon dioxide, during engine operations, each turbine engine 110 is operable with a higher heat capacity. In some embodiments, the higher heat capacity facilitates the operation of turbine engine system 300 with higher compressor exit pressures at equivalent temperatures (i.e., more compressor stages at equal temperature) as compared to conventional turbine engine systems. As such, the overall operating efficiency of turbine engine system 300 is higher as compared to other known turbine engine systems. Moreover, with the use of working fluid 150, combustion rates within turbine engine system 300 are more easily controlled via control of the amount of oxygen supplied to each turbine 110 within system 300, as compared to known turbine engine systems. As such, a more uniform heat release and/or advanced re-heat combustion is facilitated to be achieved.

Heat exchanger 312 facilitates reducing the operating temperature of stream 150. The reduced operating temperature facilitates increasing a density of stream 150 which facilitates a stream 356 being discharged from heat exchanger 312 to storage chamber 140 at a higher pressure than would normally be possible with than streams 150 having a higher operating temperature. The increased pressure facilitates the compression of stream 150 within compressor 142 and within storage chamber 140. In addition, in the exemplary embodiment, depending on loading requirements, a portion 360 of working fluid 150 entering each turbine 110 is bled from each turbine, i.e., 320, 322, and 324 for sequestration. More specifically, in the exemplary embodiment, the portion 360 of $CO_2$ stream 150 bled from each turbine engine 320, 322, and 324 is approximately equal to the volume (or mass) fraction of $CO_2$ produced during combustion within that respective turbine 320, 322, and 324. In the exemplary embodiment, the higher heat capacity of the $CO_2$ working fluid stream 150 is of a sufficient pressure to enable the portion 360 bled from each turbine 110 to be channeled directly to storage chamber 140.

Moreover, during turbine operation, in the exemplary embodiment, cooling fluid flowing through heat exchanger 112 facilitates reducing an operating temperature of exhaust 108, such that water vapor contained in exhaust gases 108 is condensed and such that carbon dioxide $CO_2$ contained in exhaust gases 108 is substantially separated from the water vapor. In the exemplary embodiment, all of the residual $CO_2$ stream produced is returned to engine 110 via working fluid stream 150.

The above-described method and system for operating a turbine engine system with a substantially nitrogen-free working fluid facilitate the production of power from a turbine engine system in a cost-efficient and reliable manner. Further, the above-described method and system facilitates reducing the generation of nitrous oxide and carbon dioxide as compared to known turbine engine systems. As a result, a turbine engine system is provided that facilitates the generation of clean and relatively inexpensive power, while reducing the generation of NOx, CO, and $CO_2$.

Exemplary embodiments of a method and system for operating a turbine engine with a substantially nitrogen-free working fluid are described above in detail. The method and systems are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system as described herein.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A gas turbine engine system comprising:
   at least a first gas turbine engine, a second gas turbine engine, and a last gas turbine engine of a plurality of substantially identical gas turbine engines coupled together in serial flow communication wherein each gas turbine engine downstream of said first gas turbine engine receives all of a substantially nitrogen-free exhaust from the gas turbine engine directly upstream and wherein each gas turbine engine upstream of said last gas turbine engine discharges a respective substantially nitrogen-free exhaust to the gas turbine engine directly downstream, each of said gas turbine engines comprises at least one compressor, at least one combustion chamber and at least a low pressure turbine and a high pressure turbine downstream from said combustion chamber, each said combustion chamber is coupled in flow communication to a source of hydrocarbonaceous fuel and to a source of oxygen, a working fluid of each said gas turbine engine being substantially nitrogen-free; and
   an exhaust gas conditioning system coupled between a discharge outlet of the last of said gas turbine engines coupled together in said system and an inlet of the first of said gas turbine engines coupled together in said system, said exhaust gas conditioning system configured to remove heat and water vapor from exhaust gases only from said last gas turbine engine to generate a flow of conditioned exhaust gas and to direct the flow of conditioned exhaust gas to said first gas turbine engine as a gas turbine engine working fluid, wherein said exhaust gas conditioning system is the only exhaust gas conditioning system coupled to the plurality of substantially identical gas turbine engines.

2. A gas turbine engine system in accordance with claim 1 further comprising a sequestration chamber coupled downstream from said exhaust gas conditioning system for storing at least a portion of exhaust discharged from said gas turbine engine system.

3. A gas turbine engine system in accordance with claim 2 wherein said sequestration chamber comprises a sub-surface storage chamber.

4. A gas turbine engine system in accordance with claim 2 wherein said exhaust gas conditioning system comprises at least one of a heat exchanger and an air separation unit coupled in flow communication between said last gas turbine engine and said sequestration chamber, and between said first gas turbine inlet and said last turbine engine discharge outlet.

5. A gas turbine engine system in accordance with claim 4 wherein each of said plurality of gas turbine engines is operable with a stream of carbon dioxide supplied from said exhaust gas conditioning system for use as a working fluid.

6. A gas turbine engine system in accordance with claim 1 wherein said exhaust gas conditioning system facilitates improving an operating efficiency of each of said plurality of gas turbine engines.

7. A gas turbine engine system in accordance with claim 1 wherein said exhaust gas conditioning system facilitates reducing nitrous oxide emissions generated from said gas turbine engine system.

8. A power generation system comprising:

a first gas turbine engine comprising an inlet and a discharge outlet; and a second gas turbine engine substantially identical to said first gas turbine engine, said second gas turbine engine comprising an inlet and a discharge outlet, said second gas turbine engine inlet coupled to said first gas turbine engine discharge outlet for receiving all of a substantially nitrogen-free flow of exhaust gases discharged therefrom for use as a working fluid in said second gas turbine engine;

a third gas turbine engine substantially identical to said first and second gas turbine engines, said third gas turbine engine comprising an inlet and a discharge outlet, said third gas turbine engine inlet coupled to said second gas turbine engine discharge outlet for receiving all of a substantially nitrogen-free flow of exhaust gases discharged therefrom for use as a working fluid in said third gas turbine engine, each of said first, second, and third gas turbine engines comprises at least one compressor, at least one combustion chamber and at least a low pressure turbine and a high pressure turbine downstream from said at least one combustion chamber, each of said at least one combustion chambers is coupled in flow communication to a source of hydrocarbonaceous fuel and to a source of oxygen; and an exhaust gas conditioning system coupled between said third gas turbine discharge outlet and said first gas turbine engine inlet, said exhaust gas conditioning system receives all of the exhaust discharged from said third gas turbine engine.

9. A power generation system in accordance with claim 8 wherein each of said first, second, and third gas turbine engines is operable with a working fluid that is substantially nitrogen-free.

10. A power generation system in accordance with claim 8 further comprising a sequestration chamber for storing carbon dioxide, said sequestration chamber coupled to exhaust gas conditioning system for receiving a portion of exhaust discharged from said exhaust gas conditioning system.

11. A power generation system in accordance with claim 10 wherein said sequestration chamber is further coupled to each of said first, second, and third turbine gas engines for receiving a portion of working fluid bled from each of said first, second, and third turbine gas engines.

12. A power generation system in accordance with claim 10 wherein said sequestration chamber comprises a sub-surface chamber.

13. A power generation system in accordance with claim 8 wherein said exhaust gas conditioning system comprises at least one of a heat exchanger and an air separation unit.

* * * * *